May 1, 1934. A. DINA 1,957,200

LENS HOLDER, ADJUSTER, AND ALIGNER FOR MOTION PICTURE PROJECTION MACHINES

Filed Feb. 28, 1930

INVENTOR
Augusto Dina
BY
Howard W. Dix
ATTORNEY

Patented May 1, 1934

1,957,200

UNITED STATES PATENT OFFICE 1,957,200

LENS HOLDER, ADJUSTER, AND ALIGNER FOR MOTION PICTURE PROJECTION MACHINES

Augusto Dina, Elizabeth, N. J., assignor to International Projector Corporation, New York, N. Y., a corporation of Delaware Application February 28, 1930, Serial No. 432,053

3 Claims. (Cl. 88—24)

This invention relates to a new and useful improvement in means for holding and adjusting lenses especially adaptable for use in connection with the insertion and removal of lenses in motion picture apparatus such as motion picture projectors.

A main object of the invention is to provide a simple, efficient, and readily operable means whereby a lens or lenses may be easily and quickly removed from the machine and either the same one replaced or a new one substituted therefor with absolute certainty that the lens will be adjusted in exactly proper alignment and position when so inserted without the necessity of any manipulations other than the simplest ones on the part of the operator.

Further and more specific objects, features, and advantages will more clearly appear from the detailed description given below when taken in connection with the accompanying drawing which forms part of the specification and which illustrates one present preferred form of the invention.

In the general contemplation of the invention it is readily perceived that when a lens, preferably in its barrel, is taken out of the machine, it is very desirable that it can be replaced in exactly the same position as before removal without any extra and time consuming efforts on the part of the operator. In other words, it must be possible to insert the lens or another lens in the support or mount and be absolutely sure that it will be axially and angularly aligned with the rest of the machine as before and with the minimum of effort on the part of the operator.

To this end the invention includes a lens housing or barrel receivable within a mount, in combination, with means on the barrel adapted to be aligned or oriented. Means are disposed on the mount so that when the barrel is inserted therein it will be certain that the barrel is returned on the mount to its proper position. In this position the lens will be in proper axial and angular position with respect to the beam of the projection light. Such orienting means is generally a collar on the barrel having an opening therein through which a stud or pin on the mount projects. The stud is so related to the mount and the collar so disposed on the barrel that when the pin is received in the collar opening, the lens will be angularly properly disposed in the beam, and when the collar is shoved up until it abuts the mount, then the lens is axially in proper position.

The present preferred form of the invention is shown in the drawing in which.

Figure 1:
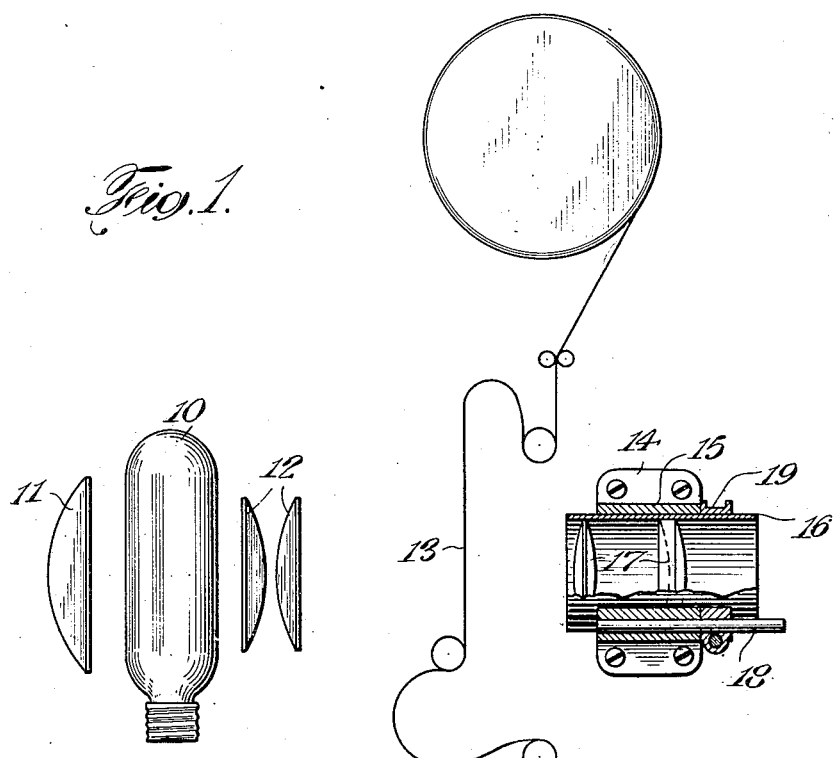
Fig. 1 is a somewhat diagrammatic view of a picture projection machine with the lens barrel in the mount in operative position.
Figure 2:
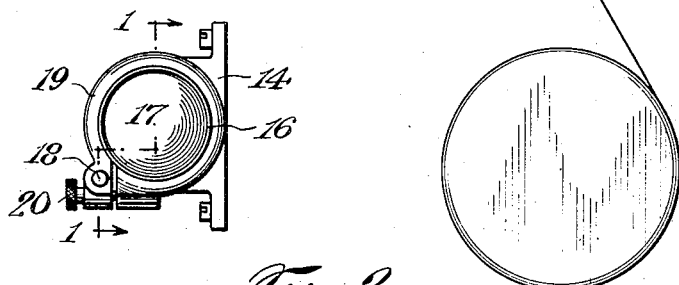
Fig. 2 is a front elevation of the lens barrel on the mount.
Figure 3:
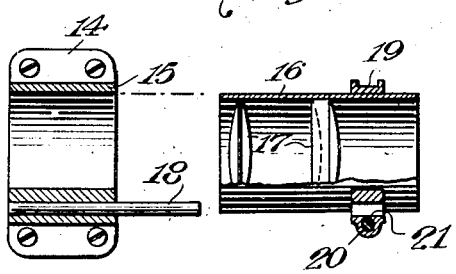
Fig. 3 is a vertical longitudinal section taken through the mount and barrel and with the barrel withdrawn from the mount.

As shown in the drawing, the invention is adapted to be employed in a projector which has a source of light 10, a reflector 11, and a pair of condensers 12, a film 13, and a support or mount 14 for a lens unit. This mount is preferably provided with a circular portion 15 to receive the barrel 16 which contains the lens or lenses 17 in the usual manner. Preferably the fit between the portion 15 and the lens barrel 16 is rather snug to prevent movement of the lens barrel as mounted in the optical axis.

It is obvious to one skilled in this art that the barrel, with any particular lens or lens combination therein, must be placed axially along the light beam in a certain position to project the picture properly. Also it is true that the barrel must be turned angularly to just the right position to be symmetrical with the beam. When the barrel is placed in this exact position and is functioning properly, then a collar such as 19 is placed around the barrel 16 just beyond the mount 15 and, without changing the longitudinal or angular position of the barrel, is clamped thereon by means of the screw 20, the collar being a split ring as shown. At the same time, the barrel is provided with an opening such as the bore 21 which is to be aligned with a pin or stud such as 18 projecting from the mount 15, which engagement determines the proper angular position of the barrel in the mount. The abutment of the collar 19 against the end surface of the mount will determine the longitudinal proper position of the barrel along the axis of the projection beam.

Suppose that it is desired to remove the barrel from the mount in order to clean it. The collar 19 is gripped and the barrel is pulled out of the mount without unclamping the collar 19 therefrom. It is then cleaned. The barrel may be replaced by pushing it into the mount until the collar 19 abuts the mount 15, being certain that in so doing the opening 21 is aligned with the pin 18 as the barrel is thus being reinserted. Thus it is known that the lens is back in exactly the same place as before and that the operation of both removal and reinsertion has taken only a few seconds.

With this form of mount, a plurality of lenses and lens barrels may be employed with the one mount, so that all sorts of optical conditions can be obtained with the one machine. If other forms of lenses are to be substituted in place of one another as the occasion requires, then it is merely necessary to see that each lens barrel has been inserted in and mounted properly and has had the pin or shaft 18 properly aligned with the collar 19. After this alignment the collar 19 can be firmly clamped on the barrel and thereafter the insertion and removal of that particular lens or barrel with respect to its mount is as simple and easy and quick as above described.

Thus there has been provided a simple, compact, quick, and efficient means whereby a lens or a plurality of lenses may be employed with a machine and each and every one of the lens systems can be quickly and easily and accurately removed from and inserted into the lens mount without any trouble whatsoever and with certainty that the lenses will be axially and angularly in proper position.

While the invention has been described in detail and with respect to a present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications which may come within the language or scope of any one or more of the appended claims.

What is claimed, is,

1. In combination, a lens mount apertured to receive a lens barrel, a barrel slidably disposed therein and in a definite axial and angular position with respect to the mount, a clamping collar adapted to be adjustably clamped onto the barrel at any desired point along the length of the barrel and to abut the end of the mount when the barrel is in position in said aperture, said clamping collar having an opening therein and a pin or shaft projecting from the mount into said opening to determine the angular position of the barrel with respect to the mount.

2. In combination, a lens mount apertured to receive a lens barrel, a barrel slidably disposed therein and in a definite axial and angular position with respect to the mount, a clamping collar adapted to be adjustably clamped onto the barrel at any desired point along the length of the barrel and to abut the end of the mount when the barrel is in position in said aperture, said collar and mount having a cooperating pin and opening into which the pin is adapted to project as the barrel is slipped into the aperture in order to definitely determine the angular position of the barrel with respect to the mount.

3. In a motion picture projecting machine, a lens holder, a lens tube adapted to be slidably positioned within the lens holder, an adjustable stop mounted upon the circumference of the tube and adapted to abut against the lens holder, and cooperating means located upon the adjustable stop and lens holder respectively for locating the lens tube in the lens holder in predetermined angular relation.

AUGUSTO DINA.